United States Patent [19]
Healy et al.

[11] Patent Number: 6,066,374
[45] Date of Patent: May 23, 2000

[54] TRANSPARENT, LIGHT RESISTANT CONTAINER FOR MEDICINAL AGENTS

[75] Inventors: Thomas E. Healy, Blue Springs; Robert B. Nichols, Kansas City; Richard D. Knight, Lee's Summit, all of Mo.

[73] Assignee: Alphapointe Association for the Blind, Kansas City, Mo.

[21] Appl. No.: 08/568,804

[22] Filed: Dec. 7, 1995

[51] Int. Cl.$^7$ ..................................................... B65D 83/04
[52] U.S. Cl. .................... 428/35.7; 428/36.4; 428/36.92; 428/213; 206/524.6; 206/540; 215/DIG. 3
[58] Field of Search .................................. 428/35.7, 36.4, 428/36.92, 213; 206/524.2, 524.6, 528, 540, 524.01; 215/1 C, DIG. 3, DIG. 4

[56] References Cited

U.S. PATENT DOCUMENTS 4,102,848  7/1978  Koch et al. ............................ 260/31.6

Primary Examiner—Rena L. Dye
Attorney, Agent, or Firm—Hovey, Williams, Timmons & Collins

[57] ABSTRACT

A transparent, light resistant container is provided for storage of medicinal agents, such as tablets, capsules, and the like. In broad terms, the container includes a container body having self-sustaining wall structure of predetermined thickness formed from a synthetic resin composition. A quantity of a coloring agent dispersed in the resin composition. The quantity of the coloring agent is correlated with the thickness of the wall structure to permit transmission through the wall structure of no more than 10% of light having a wavelength of between about 400 nm to 450 nm while permitting transmission through the wall structure of adequate visible light to allow external visual inspection of printed characters on solid medicinal tablets and capsules stored in the container. In addition, an amount of a UV absorber is dispersed in the resin composition. The amount of UV absorber is also correlated with the thickness of the wall structure and sufficient to permit transmission through the wall structure of the predetermined thickness of no more than 10% of light having a wavelength between about 290 nm to 400 nm.

10 Claims, 1 Drawing Sheet

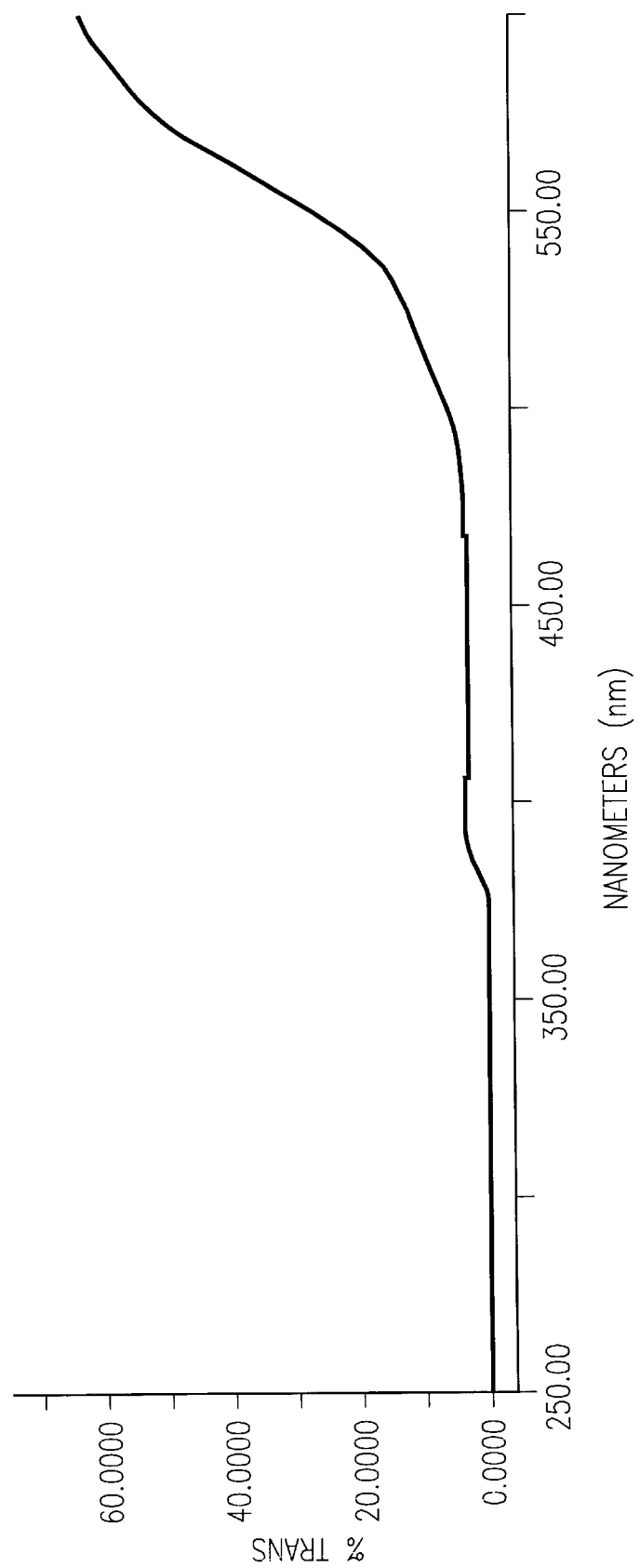

TRANSPARENT, LIGHT RESISTANT CONTAINER FOR MEDICINAL AGENTS

BACKGROUND OF THE INVENTION

1. Field of the Invention

The present invention relates generally to a transparent plastic container for storing medicinal agents formed into solid units, such as tablets, capsules, caplets, pills, and the like. More particularly, the transparent, light resistant container hereof includes a generally transparent wall structure of a predetermined thickness which permits visual inspection of the medicinal agents stored in the container, and inhibits transmission through the wall structure of light of a selected wavelength that could be detrimental to medicinal agents stored in the container. The present invention also relates to a resin used in forming the container which has dispersed therein a coloring agent, and an ultraviolet light radiation absorber which in combination, and correlated with the thickness of the wall structure, perform the unique function of precluding entry of undesirable light rays into the container while at the same time allowing visual observation of the contents of the container.

2. Description of the Prior Art

Presently, the United States Pharmacopeia (USP) includes regulations regarding certain properties of containers for storage of medicinal agents formed into solid units, such as tablets, capsules, caplets, pills, and the like. In USP 23, Section 661, entitled "Light Transmission Standards for UV Transmission", incorporated by reference herein, the USP requires that medicinal agents which are intended for oral or topical administration must be stored in a container which permits transmission into the container of no more than 10% of ultraviolet and visible light having a wavelength of between 290 nm to 450 nm. Light in this range potentially can be harmful to such medicinal agents during extended storage.

As a result, in the field of medicinal containers, most containers are generally formed from an opaque plastic in order to meet the USP requirements for light transmission. Such plastics inhibit the transmission through the container wall structure of light having a wavelength of between 290 nm and 450 nm. However, by virtue of the fact that these containers are opaque, transmission through the wall structure of visible light is also inhibited, preventing inspection of the medication in the container without opening the container.

State laws generally require that a licensed pharmacist verify that the medication in each container correspond with the label designation on the container before a filled container can be released to a patient. Therefore, the pharmacist must open each filled container and inspect the contents of such containers to verify that the proper medication is enclosed.

It is also known to provide an opaque covering for a generally transparent container. Once such a covered container is filled with the prescribed quantity of medicinal agents, the container is closed by a removable lid. Although the covering inhibits transmission through the container wall structure of undesirable light, transmission of visible light through the wall structure is also inhibited. As a result, the covering prevents inspection of the medication in the container without removing the lid.

A particular problem has arisen in recent years regarding use of opaque medicinal containers and coverings in automated filling of the containers with prescription medications. In prescription drug dispensing operations, such as those carried out by the Department of Veterans' Affairs where large numbers of containers filled with prescription medication are dispensed daily, the filling of containers has been highly automated. For example, it is now common to provide equipment which is capable of reading a bar coded label on each container and delivering the exact number of tablets or capsules into the container at the dispensing station, and to do so by directing a prescribed medication from a medication bin to the open container. A large number of different bins store medicine to be dispensed to the single filling station.

Lids are placed on each container as it emerges from the filling station and is moved along a conveyer line to protect the medication from contamination and spillage. Thus, a series of containers are directed by the conveyer or equivalent means to the final packaging or delivery area of the equipment. In most instances, each container holds a different medication and number of tablets or capsules therein.

Notwithstanding the efficiencies realized from automated filling of the containers, it is still necessary for a licensed pharmacist to remove the lid from each container (for example, a screw-top lid) and visually inspect the medication of each container to verify that the medication corresponds with the prescription represented by the bar coded label. In view of the fact that medicinal agents are commonly identified by size, shape, color patterns, and printed characters appearing on the surface of the tablets and capsules, the pharmacist can carry out the requisite inspection of the medication in prior art containers by removing the lid, and looking into the container to confirm that the medication does correspond with the prescription. Upon confirmation that the medication is correct, the lid must then be reattached to the container, so that the container may be released for shipment. If the medication does not correspond to the prescription, the medication is removed.

Removing and reattaching lids is an arduous and time consuming task, and is also wasteful of a pharmacist's time and is expensive. Furthermore, the mundane task of removing and reattaching lids by a pharmacist may also result in inattentiveness which may then lead to errors. Such errors can have dangerous consequences to patients receiving the medication, such as ingestion of improper medication. Additionally, the continual opening and closing of container lids may lead to contraction of medical problems by the pharmacist, such as carpal tunnel syndrome. Therefore a significant, and heretofore unsolved, need exists to provide a container for medicinal agents which meets the requirements of the USP, and which allows visual inspection of the medication in the container without removing the container lid.

SUMMARY OF THE INVENTION

It is, therefore, an object of the present invention to provide a transparent, light resistant container for storage of medicinal agents which permits visual inspection by a pharmacist as well as the patient of printed characters on the medicinal agents, as well as other indicia thereof, stored within the container without opening the container, and which inhibits transmission through the wall structure of light within a preselected range of wavelengths.

It is another object of the present invention to provide such a container having wall structure with a desirable colored appearance and which permits transmission through the wall structure of no more than 10% of light having a wavelength of between about 290 nm to 450 nm.

It is a further object of the present invention to provide a composition for forming such a container which includes a synthetic resin, and, dispersed in the resin, a quantity of a coloring agent for imparting the colored appearance, and an amount of a UV absorber. The quantity of the coloring agent and the amount of the UV absorber are correlated with the thickness of the wall structure to cooperably inhibit transmission of light through the container wall structure having a wavelength between about 290 nm to 450 nm.

A transparent, light resistant container is provided for storage of solid medicinal agents, such as tablets, capsules, and the like. In broad terms, the container includes a container body having self-sustaining wall structure of predetermined thickness formed from a composition including a synthetic resin, such as a styrenic resin. Alternatively, a thermoplastic polyester, such as polyethylene terephthalate (PET), PET-G or PET-E, may be used. In addition, other synthetic resin materials may also be used, such as clarified polypropylene, clear polyvinyl chloride (PVC), or polycarbonate. Such resins yield a container which includes a generally transparent wall structure and is sufficiently impact resistant to withstand being dropped from a height of at least about 10 feet.

The composition also includes a quantity of a coloring agent dispersed in the resin. The quantity of the coloring agent is correlated with the thickness of the wall structure, and is sufficient to impart a preferred, generally amber appearance to the wall structure while permitting transmission through the wall structure of adequate visible light to allow external visual inspection of printed characters on solid medicinal tablets and capsules stored in the container. Additionally, the quantity of the coloring agent is correlated with the thickness of the wall structure to permit transmission through the wall structure of no more than 10% of light having a wavelength of between about 400 nm to 450 nm.

Alternatively, other coloring agents may be used which are correlated with the thickness of the wall structure to permit transmission through the wall structure of no more than 10% of light having a wavelength of between about 400 nm to 450 nm. For example, coloring agents may be used which impart a generally blue, green, yellow, orange, or red appearance to the wall structure, and which include an absorption spectrum including the range of 400 nm to 450 nm.

The composition further includes an amount of a UV absorber dispersed in the resin. The amount of the UV absorber is also correlated with the thickness of the wall structure, and is sufficient to permit transmission through the wall structure of the predetermined thickness of no more than 10% of light having a wavelength between about 290 nm to 400 nm. It will be appreciated that the composition including the quantity of the coloring agent, and the amount of the UV absorber in combination with the thickness of the wall structure permits transmission through the wall structure of no more than 10% of light having a wavelength of between about 290 nm to 450 nm.

The container thus formed from the composition advantageously complies with the requirements of the USP while permitting visual inspection of the medication stored in the container. As a result, an inspector, such as a pharmacist, may confirm the correctness of the medication without removing the lid.

It is noted that some printed characters having certain colors, such as yellow, may not be able to be detected clearly through the preferred wall structure, and thus an inspector may have to open a container storing medication having such characters to verify the correctness of the contents. The container, however, reduces the number of containers which must be opened, and, therefore, increases the efficiency of inspecting the contents of containers.

DESCRIPTION OF THE DRAWINGS

The single FIGURE of the drawing is a graph showing a plot of the percentage of transmission of light as a function of wavelength through the wall structure of a preferred container formed from a preferred synthetic resin composition.

DETAILED DESCRIPTION OF THE PREFERRED EMBODIMENT

A transparent, light resistant container for storage of solid medicinal agents, such as tablets, capsules, and the like, preferably includes a container body having self-sustaining wall structure of a predetermined thickness, and a removable lid configured for coupling with the container body to selectively open and close the container. The container body may be of various sizes, but in preferred forms generally has a volume of about 120 cc, 200 cc, or 250 cc. It is noted that the terms "tablets" and "capsules" as used herein is meant to include all forms of solid medicinal agents configured for oral administration whether they be in the form of a tablet, capsule, caplet, pill or other solid dose unit.

The thickness of the wall structure is between about 0.030–0.075". By providing a wall structure within such a range of thicknesses, the container body is sufficiently impact resistant to withstand a drop from a height of about 10 feet. Medicinal containers, such as the preferred container, are often subjected to such drops.

In addition, the material and manufacturing costs of producing a container having a wall structure within such a range of thicknesses is relatively reasonable. As a result, when a patient has finished taking the medication in the container, the container may be conveniently discarded.

The wall structure of the preferred container is relatively transparent to allow passage through the wall structure of adequate visible light to allow external inspection of medication stored within the container body. The wall structure also permits transmission therethrough of no more than 10% of light having a wavelength of between about 290 nm and 450 nm.

The container is formed from a synthetic resin composition having a selected blend formula to yield a container having the above-mentioned characteristics. The composition broadly includes a synthetic resin, a coloring agent, a UV absorber and a mold release lubricant. The composition broadly comprises from about 99.0–99.8% by weight of the synthetic resin, from about 0.10–0.20% by weight of the coloring agent, from about 0.05–0.10% by weight of the UV absorber, and from about 0.05–0.10% by weight of the mold release lubricant.

The synthetic resin is preferably a styrene-butadiene (SB) copolymer resin. SB copolymer resin yields a container which is generally transparent to allow observation of writing and color on items within the container. Additionally; the container is sufficiently impact resistant to withstand being dropped onto a relatively hard surface, such as concrete or tile, from a height of 10 feet.

Several preferred SB copolymer resins are marketed under the registered trademark "K-RESIN" by Phillips Chemical Company (Phillips), Box 792, Pasadena, Tex. 77501-0792. Several of the preferred SB copolymers, such as KR03 resin and KRO5 resin, are listed in a pamphlet produced by Phillips, and entitled "K-RESIN", incorporated herein by reference.

The preferred KR03 and KR05 SB copolymer resins include the following nominal physical properties: a density of about 1.01 g/cc, a condition G flow rate of about 8.0 g/10 min, a tensile yield strength at 2" per min. of about 3700 psi, an elongation of about 160%, a flexural modulus of about 205,000 psi, a flexural yield strength of about 4900 psi, a heat deflection temperature at 264 psi of about 163° F., an izod impact strength for a ⅛ notched specimen of about 0.75 ft·lbs/in, a shore D hardness of about 65, a vicat softening point of about 188° F., a light transmission of between about 89–91%, a moisture vapor transmission of about 5 g·mil/100 $in^2/24$ h, and an $O_2$ transmission rate of about 250 cc·mil/ 100 $in^2/24$ h. Phillips markets several other styrenic resins under the "K-RESIN" trademark which may also be used, such as KR04 and KR10.

Of course, any other synthetic resin material may be used which is compatible with the coloring agent, the UV absorber, and the mold release lubricant, and which yields a container having the above-mentioned characteristics. For example, the synthetic resin may also include PET, PET-G, PET-E, clarified polypropylene, clear polyvinyl chloride (PVC), or polycarbonate.

The quantity of the coloring agent dispersed in the resin is correlated with the thickness of the wall structure to impart a generally brownish-yellow amber color to the wall structure while permitting transmission through the wall structure of adequate visible light to allow external visual inspection of printed characters on the medicinal agents within the container, and permitting transmission through the wall structure of no more than 10% of light having a wavelength of between about 400 nm to 450 nm. The coloring agent is preferably the colorant marketed by Allied Color Industries, Inc., 800 Ken Mar Industrial Parkway, Cleveland, Ohio 44147 under the product identification MC500042SBRU Amber (amber colorant).

The preferred amber colorant includes three coloring components. The first coloring component is marketed under the trade name No. 9609 FD&C Yellow #5 (Yellow #5) by Warner-Jenkinson Company (Warner-Jenkinson), 2526 Baldwin Street, St. Louis, Mo. 63106. The second coloring component is marketed under the trade name No. 9610 FD&C Yellow #6 (Yellow #6) by Warner-Jenkinson.

The third coloring component is carbon black marketed under the trade name MPC Channel Black Drummed by Keystone Aniline Corporation (KAC), 2501 West Fulton Street, Chicago, Ill. 60612. This third component which is a member of the carbon family is further identified by product code number 110-007-60, CAS registry number 1333-86-4, and shall be hereinafter referred to as carbon black.

The preferred amber colorant comprises about 42.6% by weight of Yellow #5, about 56.8% by weight of Yellow #6, and about 0.6% by weight of carbon black. The amount of the preferred amber colorant dispersed in the resin is correlated with the thickness of the wall structure to permit transmission of no more than 10% of light having a wavelength of between about 400 nm to 450 nm.

The amount of the UV absorber dispersed in the resin is correlated with the thickness of the wall structure to permit transmission through the wall structure of no more than 10% of light having a wavelength between about 290 nm to 400 nm. Preferably, the UV absorber is 2-(2-hydroxy-5-methylphenyl) benzotriazole marketed under the product name Tinuvin P by Ciba Additives, Ciba-Geigy Corporation (Ciba-Geigy), Seven Skyline Drive, Hawthorne, N.Y. 10532-2188.

The mold release lubricant is provided to prevent damage to the container body upon removal from a mold. The mold release lubricant is preferably zinc stearate.

EXAMPLE 1

A preferred container is formed through an injection blow molding process from a preferred composition. The preferred container is some what resilient and includes wall structure having a thickness of about 0.045". As a result, the preferred container is sufficiently impact resistant to withstand being dropped from a height of about 10 feet.

The preferred container formed from the preferred composition permits transmission through the wall structure of adequate visible light to allow external visual inspection of six point type face printed characters on medicinal agents stored in the container, and positioned generally at a midpoint of the container. The preferred composition also yields a container which permits transmission through the wall structure of no more than 10% of light having a wavelength between about 290 nm to 450 nm.

The preferred composition includes about four pounds of a preferred color concentrate for each one hundred pounds of production styrenic resin, such as KR05 resin. This ratio may also be expressed as a mix ratio of 25:1 styrenic resin to color concentrate. The preferred color concentrate includes about 3.81% by weight of the preferred amber colorant, about 1.81% by weight of Tinuvin P, about 2.0% by weight of zinc stearate, and about 92.38% by weight of raw styrenic resin, such as KR05 resin. The raw styrenic resin is provided as a carrier for the amber colorant, Tinuvin P and zinc stearate.

The color concentrate is blended with the production styrenic resin using the above-mentioned mix ratio of 25:1 to yield the preferred composition. The preferred composition thus includes about 3.846% by weight of the color concentrate and about 96.154% by weight of the production styrenic resin.

Molded container tests have demonstrated that when a homogenous blend of the preferred styrenic resin and color concentrate is molded into a container having a wall section thickness from about 0.040" to about 0.050", such a container will transmit no more than about 10% light at any wave length in the range of about 290 nm to about 450 nm.

Referring to the graph shown in the Figure of the drawing, a plot is depicted of the transmission of light through the wall structure of a test container having a thickness of 0.045" against wavelengths ranging from about 250 nm to 600 nm. It will be appreciated from the graph that less than 10% of light having a wavelength between about 290 nm to 450 nm (the selected range) is permitted to be transmitted through the wall structure.

Although the transparent, light resistant container for medicinal agents has been described with reference to the preferred embodiment, it is noted that changes may be made, and equivalents employed herein without departing from the scope of the invention as recited in the claims. For example, KR03, KR04, or KR10 resin as well as other suitable synthetic resin materials may also be used. Additionally, other compositions having alternative blend formulas may be employed.

EXAMPLE 2

An alternative composition includes the preferred color concentrate blended with the styrenic resin at a 23:1 resin to color concentrate mix ratio. Such a composition, prior to being molded into a container, thus includes about 4.167% by weight of the color concentrate and about 95.833% by weight of the production styrenic resin.

EXAMPLE 3

A further alternative composition includes the preferred color concentrate blended with the styrenic resin at a 27:1 resin to color concentrate mix ratio. Such a composition, prior to being molded into a container, thus includes about 3.571% by weight of the color concentrate and about 96.429% by weight of the production styrenic resin.

The alternative compositions of examples 2 and 3 which include the preferred color concentrate blended with production styrenic resin at mix ratios of 23:1 and 27:1, respectively, also permit transmission of adequate visible light through the wall structure to allow external visual inspection of printed characters on the medicinal agents stored in the container while continuing to permit transmission through the wall structure of no more than 10 of light having a wavelength of between about 290 nm and 450 nm.

What is claimed is:

1. A transparent, light resistant molded plastic container having a removable lid and adapted to receive a quantity of medicinal tablets, capsules, caplets, pills or other solid dose agents having printed identifying indicia thereon of no less than about six point print and comprising:

a container body having self-sustaining wall structure of predetermined thickness within the range of about 0.030 in. to about 0.075 in, and formed from a generally transparent synthetic resin compatible with said medicinal agents, said container body being sufficiently resilient so that said wall structure of said predetermined thickness is sufficiently impact resistant to withstand being dropped from a height of about 10 feet;

a coloring agent dispersed in said resin, said coloring agent being present in an amount of from about 0.10% to about 0.20% by weight of the container body and sufficient to permit transmission through said wall structure of no more than 10% of light having a wavelength of between about 400 nm to 450 nm; and a sufficient amount of a UV absorber within the range of about 0.05% to about 0.10% by weight of the container body, said UV absorber being dispersed in said resin for and operable to permit transmission through said wall structure of said predetermined thickness of no more than 10% of light having a wavelength between about 290 nm to 400 nm, the wall thickness of the container body, the quantity of the coloring agent therein, and the amount of the UV absorber in the container body all being correlated to allow adequate visible light to pass through the wall structure of the container sufficient to permit external visual inspection of six point type face on said solid medicinal agents stored in the container when the solid medical agent is generally at the middle portion of the container body.

2. The container as set forth in claim 1, wherein said coloring agent is configured to impart a generally amber appearance to said wall structure.

3. The container as set forth in claim 1, wherein said synthetic resin further includes a mold release lubricant dispersed therein.

4. The container as set forth in claim 3, wherein said mold release lubricant includes zinc stearate.

5. The container as set forth in claim 1, wherein said predetermined thickness is between about 0.040–0.050".

6. The container as set forth in claim 1, wherein said synthetic resin comprises a styrene-butadiene copolymer.

7. The container as set forth in claim 1, wherein said container body includes from about 99.0–99.8% by weight of said synthetic resin.

8. The container as set forth in claim 1, wherein said container body includes from about 0.130–165% by weight of said coloring agent.

9. The container as set forth in claim 1, wherein said UV absorber comprises 2-(2-hydroxy-5-methylphenyl) benzotriazole.

10. The container as set forth in claim 1, wherein said container body includes from about 0.06–0.08% by weight of said UV absorber.

* * * * *